(12) United States Patent
McCullough et al.

(10) Patent No.: US 8,754,175 B2
(45) Date of Patent: Jun. 17, 2014

(54) MONOCAPPED CONDUCTIVE POLYMERS WITH ALKENYL OR ALKYNYL END GROUPS AND BLOCK COPOLYMERS THEREFROM

(75) Inventors: Richard D. McCullough, Pittsburgh, PA (US); Genevieve Sauve, Pittsburgh, PA (US); Mihaela Iovu, Pittsburgh, PA (US); Malika Jeffries-El, Ames, IA (US)

(73) Assignee: Carnegie Mellon University, Pittsburgh, PA (US)

( * ) Notice: Subject to any disclaimer, the term of this patent is extended or adjusted under 35 U.S.C. 154(b) by 377 days.

(21) Appl. No.: 11/375,581

(22) Filed: Mar. 15, 2006

(65) Prior Publication Data

US 2010/0117030 A1 May 13, 2010

Related U.S. Application Data

(60) Provisional application No. 60/661,935, filed on Mar. 16, 2005.

(51) Int. Cl.
*C08G 75/00* (2006.01)
*C08G 75/32* (2006.01)

(52) U.S. Cl.
USPC ............ 525/535; 525/417; 528/373; 528/377

(58) Field of Classification Search
USPC ............ 525/417, 535, 536; 528/73, 373, 377; 252/500
See application file for complete search history.

(56) References Cited

U.S. PATENT DOCUMENTS

| | | | | |
|---|---|---|---|---|
| 5,171,632 | A * | 12/1992 | Heeger et al. ................. | 428/364 |
| 6,602,974 | B1 * | 8/2003 | McCullough et al. ......... | 528/73 |
| 6,887,965 | B2 * | 5/2005 | McCullough et al. ......... | 528/73 |
| 7,294,288 | B2 * | 11/2007 | Koller et al. .................. | 252/500 |

OTHER PUBLICATIONS

Liu, J. et al "End Group Modification of Regioregular Polythiophene Through postpolymerization Functionalization" Macromolecules 2002 35, p. 9882-9889.*
Langeveld-Voss, B. M. et al "End-group Modification of Regioregular Poly(3-Alkylthiophene)s" Chem. Commun. 200 p. 81-82.*
Jeffries-EL, M. et al "In-Situ End-Group Functionalization of Regioregular Poly(3-Alkylthiophene) Using the grignard Metathesis polymerization Method" Advanced Materials 2004 16 p. 1017-1019.*
Jeffries-EL, M. et al. "Facile Synthesis of End-Functionalized Regioregular Poly(3-Alkylthiophene)s via Modified Grignard Metathesis Reaction" Macromolecules 2005 38 p. 10346-10352.*
Sirringhaus, H. et al "Integrated Optoelectronic Devices Based on Conjugated Polymers" Science 1998 280 p. 1741-1744.*
Hadjichristidis, N. et al Chapter 6 taken from "Block Copolymers: Synthetic Strategies, Physical Properties, and Applications" John Wiley and Sons, published online in 2003.*
Trost, B. M. et al "Comprehensive Organic Synthesis-Selectivity, Strategy, and Efficiency in Modern Organic Chemistry vol. 1-9" Elsevier, published in 1991.*
Ege, S. "Organic Chemistry: Structure and Reactivity $3^{rd}$ Edition" D.C. Heath and Company, 1994, pp. 306-309.*

* cited by examiner

*Primary Examiner* — Irina S Zemel
*Assistant Examiner* — Jeffrey Lenihan
(74) *Attorney, Agent, or Firm* — The Marbury Law Group PLLC (57) ABSTRACT

Novel polymer compositions which provide controlled end-group functionalization for polythiophenes including regioregular polythiophenes including alkenyl and alkynyl functionalization. Monocapped polymers are formed and can be converted to block copolymers. Conditions and reagents can be selected to provide more monocapping than dicapping of the polymer. Devices, films, and blends can be prepared.

17 Claims, 11 Drawing Sheets

Table

| | Grignard reagent | | End group | Di-capped [a] (R=Y) | Mono-capped [a] (R≠Y) |
|---|---|---|---|---|---|
| Mono-capped | VinylMgBr | 1 | ⟨vinyl⟩ | 0% | 91% |
| | AllylMgBr | 2 | ⟨allyl⟩ | 0% | 87% |
| | EthnylMgBr | 3 | ⟨ethynyl⟩ | 14% | 86% |
| Di-capped | PhenylMgBr | 4 | ⟨phenyl⟩ | 76% | 24% |
| | TolylMgBr | 5 | ⟨tolyl⟩ | 80% | 20% |
| | BenzylMgCl | 6 | ⟨benzyl⟩ | 80% | 20% |
| | p-OTHP-PhenylMgBr [b] | 7 | ⟨p-hydroxyphenyl⟩ | 75% | 12% |
| | MethylMgBr | 8 | — | 76% | 24% |
| | ButylMgCl | 9 | ⟨butyl⟩ | 67% | 21% |
| | t-butylMgCl [c] | 10 | ⟨t-butyl⟩ | 0% | 0% |

[a] IN CASES WHERE THE SUM IS NOT EQUAL TO 100% THE REMAINDER OF THE POLYMER IS UNCAPPED. [b] THP = TETRAHYDROPYRANYL, POLYMER WAS DEPROTECTED AND ANALYZED AS THE PHENOL. [c] NO REACTION.

MONOCAPPED CONDUCTIVE POLYMERS WITH ALKENYL OR ALKYNYL END GROUPS AND BLOCK COPOLYMERS THEREFROM

RELATED APPLICATIONS

This application claims priority to provisional patent application Ser. No. 60/661,935 filed Mar. 16, 2005, "Monocapped Conductive Polymers with Alkenyl or Alkynyl End Groups," which is hereby incorporated by reference in its entirety.

FEDERAL RIGHTS

This work was carried out with support from the Federal government including NSF grant no. CHE0107178, NSF grant no. CHE0415369, and AFOSR MURI F49620-02-10359-P00001. The government has certain rights in the invention.

BACKGROUND

A need exists to provide better, more finely controlled conductive polymers with tailored endgroups for use in block copolymer synthesis, utilization in nanofabrication, and general commercial exploitation in electronic and semiconducting devices including photovoltaic and light emitting diode applications.

Regioregular conductive polymers including polythiophenes are of particular importance. Due to their excellent electrical properties, regioregular polythiophenes are rapidly being developed into new commercial products with applications ranging from transistors to hole-transport layers in organic light-emitting diodes (OLEDs) to new specialty plastics. See, for example, Kline et al., *Adv. Mater.* 2003, 15, 1519; Brown et al., *Science* 1995, 270, 972; Sirringhaus et al. *Nature* 1999, 401, 685; Sirringhaus et al. *Science* 1998, 280, 1741; Huynh et al. *Science* 2002, 295, 2425; Bao et al. *Appl. Phys. Lett.* 1996, 69, 3; McCullough et al. *J. Org. Chem.* 1993, 58, 904; Chen et al. *J. Am. Chem. Soc.* 1995, 117, 233; and R. S. Loewe et al. *Adv. Mater.* 1999, 11, 250.

As regioregular polythiophenes grow in importance, so does the development of inexpensive and convenient methods for the synthesis of these polymers. Work has been reported for the modification and variation of side chains of regioregular, head-to-tail coupled polythiophenes (HT-PTs). See, for example, McCullough, *Adv Mater.* 1998, 10, 93. Less attention has been given to the nature and control of end groups of such polymers. Procedures published to date to functionalize end groups of conjugated polymers are limited in scope and number. See, for example, Liu et al. *Macromolecules* 2002, 35, 8; Langeveld-Voss et al. *Chem. Commun.* 2000, 2000, 81; Jayakannan et al. *Macromolecules* 2001, 34, 8; Iraqi et al. *J. Mater. Chem.* 1998, 8, 25.

Previously, it has been reported a multistep synthesis of HT-PTs bearing amino and hydroxyl groups. See, for example, Liu et al. *Macromolecules* 2002, 35, 8. The hydroxylated PTs were further derivatized and used to synthesize, e.g., HT-PT-polystyrene diblock and triblock copolymers. See, for example, J. Liu et al. *Angew. Chem. Int. Ed.* 2002, 41, 4. These copolymers can self-assemble into nanowires, resulting in surprisingly high conductivities, even with relatively low percentages of HT-PT in the copolymer. Despite these advances, new convenient synthetic methods are needed that are simple and reproducible and involve fewer numbers of synthetic steps.

In addition, U.S. Pat. No. 6,602,974 to McCullough et al. describes one system of block copolymers prepared by use of tailored endgroups. The '974 patent describes use of Grignard reagent to treat a regioregular polythiophene polymer. Also, U.S. Pat. No. 6,166,172 to McCullough et al. describes an improved method for synthesis of conducting polymers including larger scale methods.

Despite these advances, additional synthetic versatility and precision is needed. In particular, it is important to control whether one or both ends of the polymer chain are functionalized. New routes to block copolymers are needed as well as block copolymers having better processability and conductivity.

SUMMARY

A new protocol is provided for advantageously controlling end group composition of the polymer. The method can be used for the synthesis of a variety of functional end groups including important functionalities which allow for the synthesis of conducting block copolymers in only, for example, three steps. For example, the invention provides a method of making a poly(3-substituted thiophene) which is at least 70% monocapped with alkenyl or alkynyl end group comprising the step of preparing a poly(3-substituted thiophene) precursor and reacting the precursor with an alkenyl or alkynyl reagent. New compositions can be prepared by the new methods. For example, one embodiment of the invention provides a composition comprising a poly(3-substituted thiophene) which is at least 70% monocapped with alkenyl or alkynyl end group. The conductive polymers can be used in doped or undoped form. Block copolymers and blends can be prepared with controlled morphology and ability for nanoscale engineering. The invention also provides methods of using the new compositions including electronic, optical, and semiconductive devices which comprise the new compositions, as well as methods of making and using these devices. The invention provides a multilayer structure comprising at least two layers, wherein at least one of the layers comprises a composition comprising a poly(3-substituted thiophene) which is at least 70% monocapped with alkenyl or alkynyl end group, or a block copolymer prepared therefrom.

In another embodiment, a regioregular polythiophene is provided comprising aryl end groups with protecting group substituents. For example, the protecting group can provide amino, hydroxyl, or aldehyde upon deprotection. The aryl group can be phenyl. The protecting group can be a monocapping protecting group or a dicapping protecting group. The polythiophene can be deprotected.

Another embodiment provides a block copolymer composition comprising (i) a regioregular polythiophene block, (ii) an ATRP polymer block, and (iii) a dopant, wherein the block copolymer composition has a conductivity of at least 4 S/cm when doped with iodine a prepared with a film thickness of at least 500 nm. The regioregular polythiophene block and the ATRP polymer block can be covalently joined by an alkylene group such as for example an ethylene group. Another embodiment is a block copolymer composition comprising (i) a regioregular polythiophene block, (ii) a radical polymerization polymer block, and (iii) a dopant, wherein the block copolymer composition has a conductivity of at least 4 S/cm when doped with iodine a prepared with a film thickness of at least 500 nm.

DETAILED DESCRIPTION

The references cited herein can be used in the practice of the present invention, but no admission is made that the these references are prior art.

Aspects of this work are described in Jeffries-E L et al, *Adv. Mater.*, 2004, 16, No. 12, Jun. 17, 2004; Jeffries-E L et al, *Polymer Preprints*, 2004, 45(1), pages 183-184; and *Macromolecules*, 2005, 38, 10346-10352, which are hereby incorporated by reference in their entirety including drawings, tables, experimental sections, cited references, and any supplemental data. Still additional aspects of this work are also described in Iovu et al, *Polymer Preprints*, 2004, 45(1), pages 278-279, and Iovu et al. *Polymer*, 46 (2005) 8582-8586, which are also hereby incorporated by reference in their entirety including drawings, tables, experimental sections, cited references, and any supplemental data.

In addition, U.S. Pat. No. 6,602,974 to McCullough et al. describes block copolymers prepared by use of tailored end-groups and is hereby incorporated by reference in its entirety including figures, claims, and working examples. The '974 patent describes a variety of non-conductive structural polymers which can be incorporated into the same polymer chain as the conductive polymer. See also, Liu et al., *Macromolecules*, 2002, 35, 9882-9889; Liu et al., *Angew. Chem. Int. Ed.*, 2002, 41, No. 2, pages 329-332, which are incorporated by reference in their entirety. These references also describe important morphological aspects of block copolymers.

U.S. Pat. No. 6,166,172 to McCullough et al. describes an improved method for synthesis of conducting polymers (GRIM methods) including larger scale methods and is hereby incorporated by reference in its entirety. See also Loewe et al., *Macromolecules*, 2001, 34, 4324-4333 which describes regioselectivity of these reactions.

Chemistry and applications for conductive polymers, as described herein, can be further found in for example (i) McCullough, *Adv. Mater.*, 1998, No. 2, pages 93-116, (ii) McCullough et al., *Handbook of Conducting Polymers*, 2$^{nd}$ Ed., 1998, Chapter 9, pages 225-258.

In addition, electrically conductive polymers are described in *The Encyclopedia of Polymer Science and Engineering*, Wiley, 1990, pages 298-300, including polyacetylene, poly (p-phenylene), poly(p-phenylene sulfide), polypyrrole, and polythiophene, which is hereby incorporated by reference in its entirety. This reference also describes blending and copolymerization of polymers, including block copolymer formation.

Polythiophenes are described, for example, in Roncali, J., *Chem. Rev.* 1992, 92, 711; Schopf et al., *Polythiophenes: Electrically Conductive Polymers*, Springer: Berlin, 1997.

Polymeric semiconductors are described in, for example, "Organic Transistor Semiconductors" by Katz et al., *Accounts of Chemical Research*, vol. 34, no. 5, 2001, page 359 including pages 365-367, which is hereby incorporated by reference in its entirety.

These and other references cited in this application can be used in the practice of the present invention.

Figure 1:
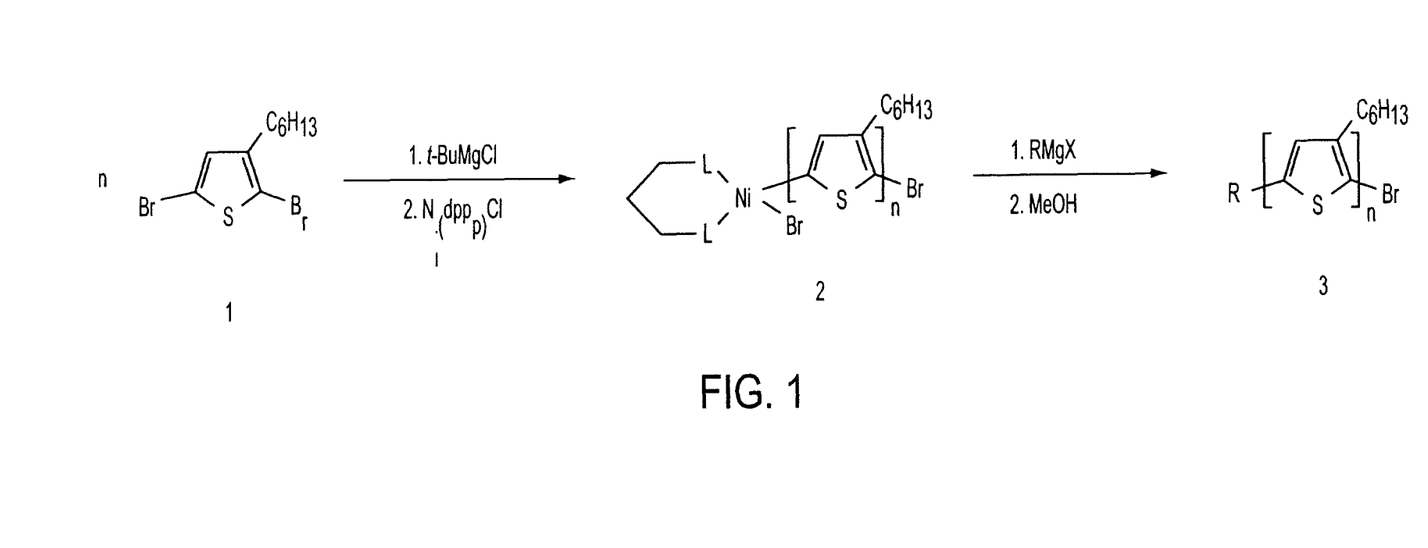
FIG. 1 shows mono-capping of the growing polymer chain by adding RMgX.

Among other objectives, an objective of this invention was to find a method to systematically functionalize the end groups of HT-PT using the Grignard metathesis polymerization method (GRIM, see for example, Loewe et al., *Adv. Mater.* 1999, 11, 250). See FIG. 1. Typical polymerization of 2,5-dibromo-3-hexylthiophene, 1, using the GRIM method generally can yield a polymer that primarily has one end-group composition, H/Br. Selective conversion of the Br terminated polymer to yield a functionalized end-capped PT can be accomplished by a post-polymerization functionalization reaction. See for example, Liu et al., *Macromolecules* 2002, 35, 8. Although the present invention is not limited by theory, the polymerization of 1 is believed to follow a chain-growth mechanism. See for example, Sheina et al. *Macromolecules* 2004, 37, 3526.

The addition of a Grignard reagent can effectively end cap the polymer, and provides a simple one-pot method to control the end-group composition of HT-PT and introduces functionality into the polymer. See FIG. 2.

Using these methods including modifications of the GRIM method (see, for example, Loewe et al., *Macromolecules* 2001, 34, 4324), a variety of R groups can be incorporated into the end of the polymer. See, for example, Sauve et al., *Polymer Preprints*, 2003, 44(2), 432. This can be accomplished, for example, in laboratory scale reactions by adding a large excess of Grignard reagent RMgX to the polymer reaction mixture after, for example, 10-15 min of polymerization time. The mixture can be then poured into a proton source, such as an alcohol such as methanol, to precipitate the polymer. The end group composition of the polymer can be analyzed by matrix-assisted laser desorption time-of-flight mass spectrometry (MALDI-TOF MS) (see, for example, Liu et al., *Macromolecules* 1999, 32, 5777). Results are summarized in FIG. 10 Table.

Figure 10:
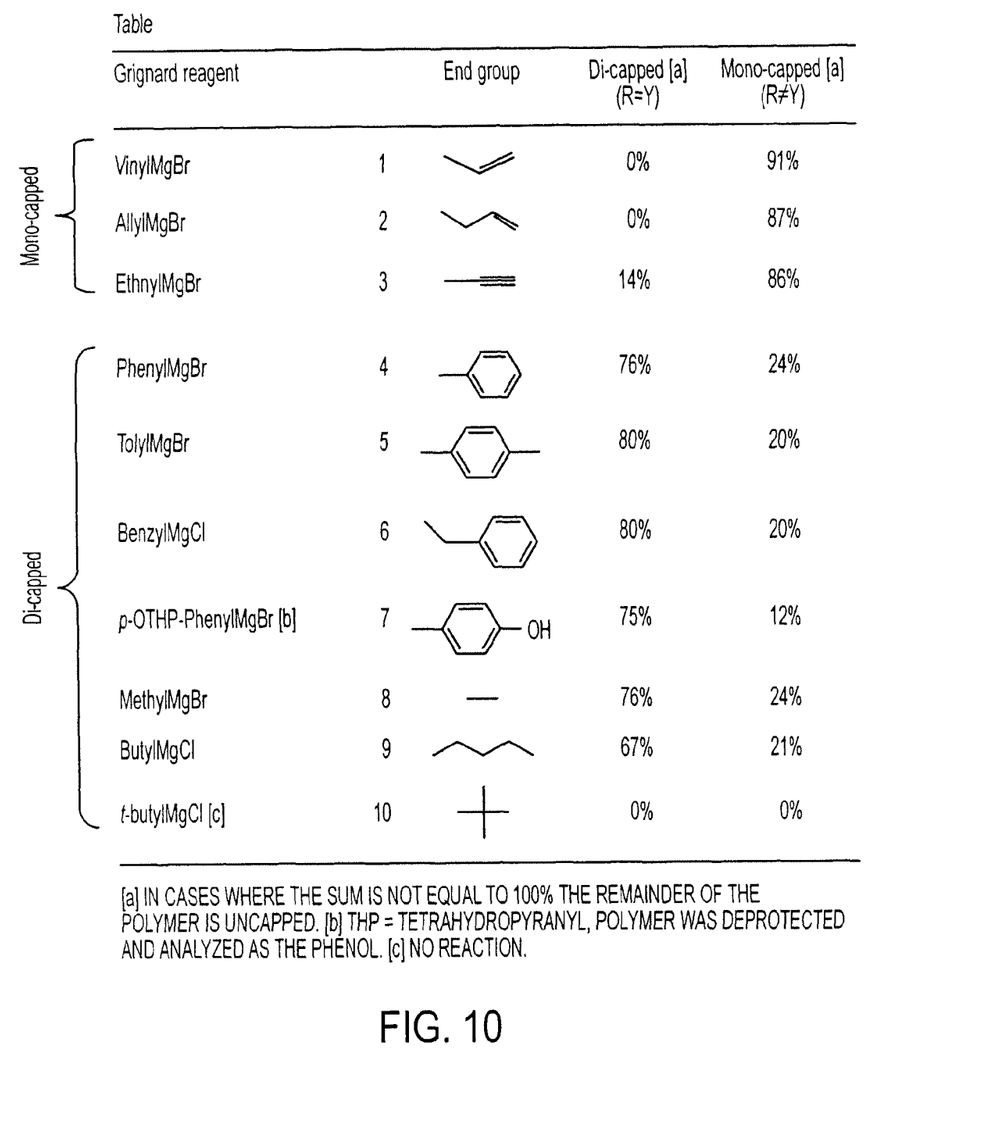
FIG. 10 provides a Table 1 showing results for different end groups for mono-capping and di-capping.

Surprisingly, some Grignard reagents can provide mono-capped products, whereas others can provide di-capped. One Grignard reagent, t-butylMgCl, may not cap the polymer, presumably because of steric hindrance. Whether mono- or di-capped polymers are obtained can be not a function of the concentration of the Grignard reagent, nor of the reaction time with the Grignard reagent. Rather, Grignard reagents that have a double or triple bond can produce mono-capped polymers, while the other ones can produce di-capped polymers (FIG. 10 Table).

Figure 2:
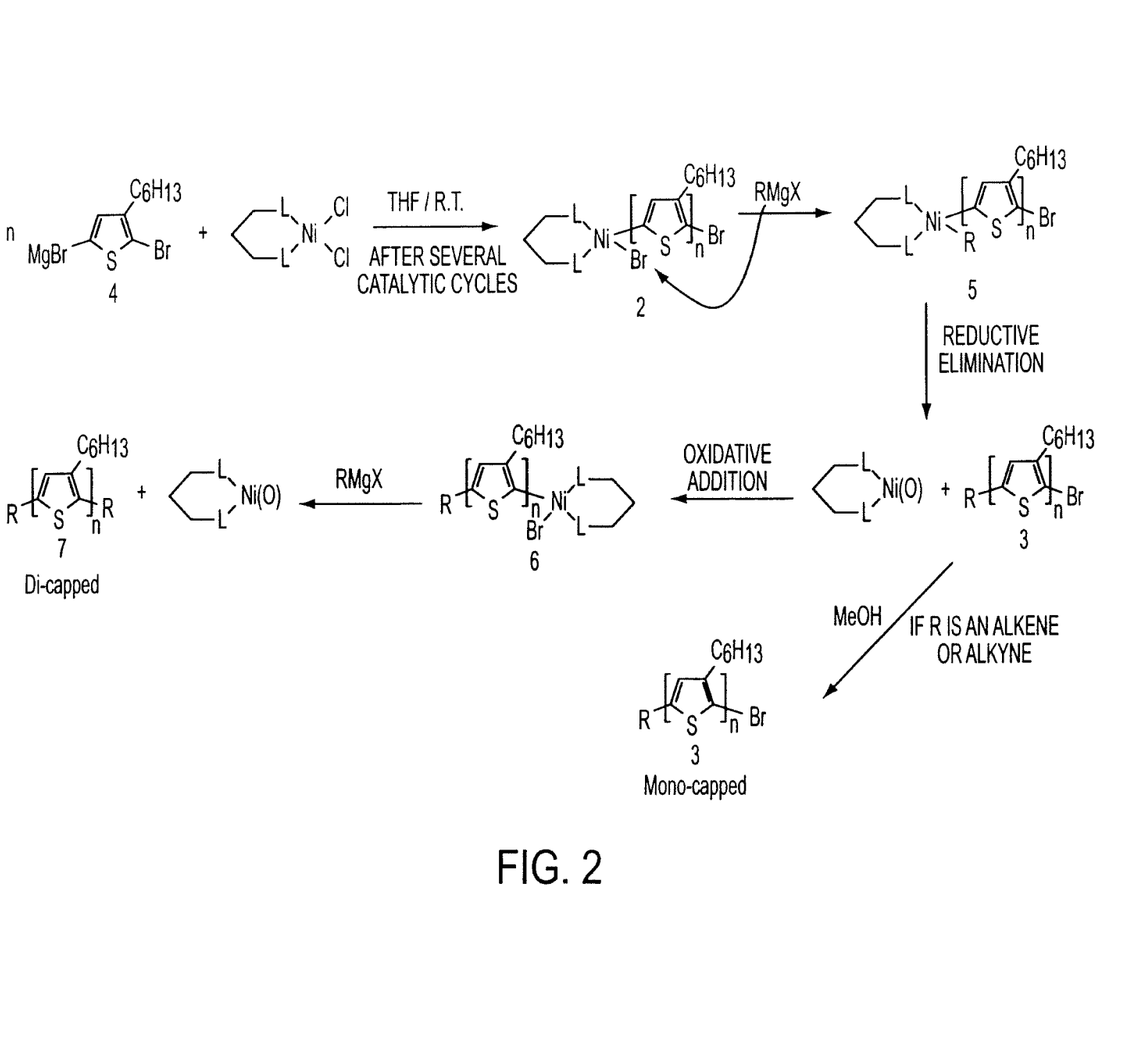
FIG. 2 shows a proposed mechanism for end capping.

Although the present invention is not limited by theory, the results for FIG. 10 Table can be explained with reference to FIG. 2. First, a polymer starting from a thienyl Grignard 4 and catalytic amounts of the Ni(dppp)Cl$_2$ is grown. After the polymerization is nearly complete, a species 2 is left in solution. Polymer 2 reacts with RMgX to yield 5, and a reductive elimination yields the mono-capped polymer 3 and highly reactive Ni$^0$dppp. The Ni can form an associative pair (Sheina et al. *Macromolecules* 2004, 37, 3526) with 3 followed by oxidative addition with 3 to give 6, which can then further react with another RMgX to yield the di-capped product 7. In the case of alkenyl and alkynyl Grignard reagents, the unsaturated group can react with reactive Ni$^0$ to form a stable pi-complex (see, for example, Tamao et al. *Bull. Chem. Soc. Jpn.* 1976, 49, 1958; R. H. Crabtree, *The Organometallic Chemistry of the Transition Metals,* 3rd ed., John Wiley & Sons, New York 2001; Tolman et al. *Organometallics* 1983, 2, 1391), hence preventing any further reaction with the bromine end group of the polymer. The unsaturated component could be from either the excess Grignard reagent or the monocapped polymer 3.

Polythiophenes of particular interest include heteroatom-substituted, alkoxy-substituted and alkyl-substituted polythiophenes including, for example, poly 3-methoxyethoxyethoxymethyl thiophene, poly 3-pentyl thiophene, poly 3-hexyl thiophene, poly 3-octyl thiophene, and poly 3-dodecyl thiophene, and copolymers thereof. If desired, number average molecular weight for the conductive polymer can be, for example, less than 1,000, or about 1,000 to about 50,000, or greater than 50,000. Number average molecular weight for block copolymers, including a non-conductive component, can be for example 50,000 to 1,000,000. Polydispersity can be for example 2 or less, or 1.5 or less, or even 1.2 or less.

The invention provides in one embodiment, therefore, a composition comprising a poly(3-substituted thiophene) which is at least 70% monocapped with alkenyl or alkynyl end group. More particularly, the poly(3-substituted thiophene) can be at least 86% monocapped with alkenyl or alkynyl end group, or more particularly, at least 91% monocapped with alkenyl or alkynyl end group. In addition to the 3-substitution, 4-substitution is also possible. The group substituents at the 3- and 4-positions can be covalently linked or not covalently joined as desired. In a preferred embodiment, the poly(3-substituted thiophene) can be a poly(3-alkyl thiophene).

In a preferred embodiment, the poly(3-substituted thiophene) is prepared by (i) Grignard metathesis polymerization of one or more 3-substituted thiophene monomers to form a polymer product, (ii) quenching the polymer product with an excess of Grignard reagent followed by treatment with a proton source.

In a preferred embodiment, the alkenyl or alkynyl end group has a number of carbon atoms from two to twelve, more particularly, from two to five, and can comprise for example C2 or C3 groups such as vinyl, allyl, or ethnyl.

Another aspect is that the poly(3-substituted thiophene) which is, for example, at least 70% monocapped with alkenyl or alkynyl end group can be also 20 percent or less dicapped, or more particularly, 10 percent or less dicapped, and even more particularly, one percent or less dicapped (see for example FIG. 10 Table).

The degree of regioregularity can be controlled and quantitatively examined if necessary. For example, the poly(3-substituted thiophene) can be at least 90% head-to-tail regioregular, or even 95% or more regioregular, or even at least 98% head-to-tail regioregular.

If desired, the poly(3-substituted thiophene) can be a copolymer. For example, copolymer structure can be tailored to integrate the energy levels with the application.

Additional information on the synthesis of end-functionalized polythiophenes can be found in Jeffries-El et al. *Macromolecules,* 38, 10346-10352. For example, MALDI-TOF data for vinyl and tolyl polymers are provided in FIG. 1; $^1$H NMR data for vinyl and tolyl polymers are provided in FIG. 2; $^1$H NMR assignments in FIG. 3; experimental methods; and additional references cited.

The ability to monocap HT-PT efficiently using alkenyl and alkynyl Grignard reagents is important because the alkene-terminated polymer can be used as building blocks in additional synthesis including the synthesis of block copolymers and diblock copolymers. Diblock copolymers can be efficiently made from polymer 1 (see, for example, Iovu et al. *Polym. Prepr. (Am. Chem. Soc., Div. Polym. Chem)* 2004, 45, 278.).

Block copolymers are generally known in the art. See for example Yang (Ed.), *The Chemistry of Nanostructured Materials,* 2003, pages 317-327 ("Block Copolymers in Nanotechnology"). Also block copolymers are described in, for example, *Block Copolymers, Overview and Critical Survey,* by Noshay and McGrath, Academic Press, 1977. For example, this text describes A-B diblock copolymers (chapter 5), A-B-A triblock copolymers (chapter 6), and -(AB)$_n$-multiblock copolymers (chapter 7), which can form the basis of block copolymer types in the present invention. Additional block copolymers including polythiophenes are described in, for example, Francois et al., *Synth. Met.* 1995, 69, 463-466, which is incorporated by reference in its entirety; Yang et al., *Macromolecules* 1993, 26, 1188-1190; Widawski et al., *Nature (London),* vol. 369, Jun. 2, 1994, 387-389; Jenekhe et al., *Science,* 279, Mar. 20, 1998, 1903-1907; Wang et al., *J. Am. Chem. Soc.* 2000, 122, 6855-6861; Li et al., *Macromolecules* 1999, 32, 3034-3044; Hempenius et al., *J. Am. Chem. Soc.* 1998, 120, 2798-2804.

Block copolymers can comprise the conductive block and the nonconductive block. The non-conductive block can include both condensation, addition, and ring-opened polymers including for example, urethanes, polyamides, polyesters, polyethers, vinyl polymers, aromatic polymers, aliphatic polymers, heteroatom polymers, siloxanes, acrylates, methacrylates, phosphazene, silanes, and the like.

If desired, block copolymers can be blended with other components including inorganic glasses and metals as well as other polymers including inorganic polymers and organic polymers. The block copolymer can be used as a compatibilizing agent.

Figure 3:
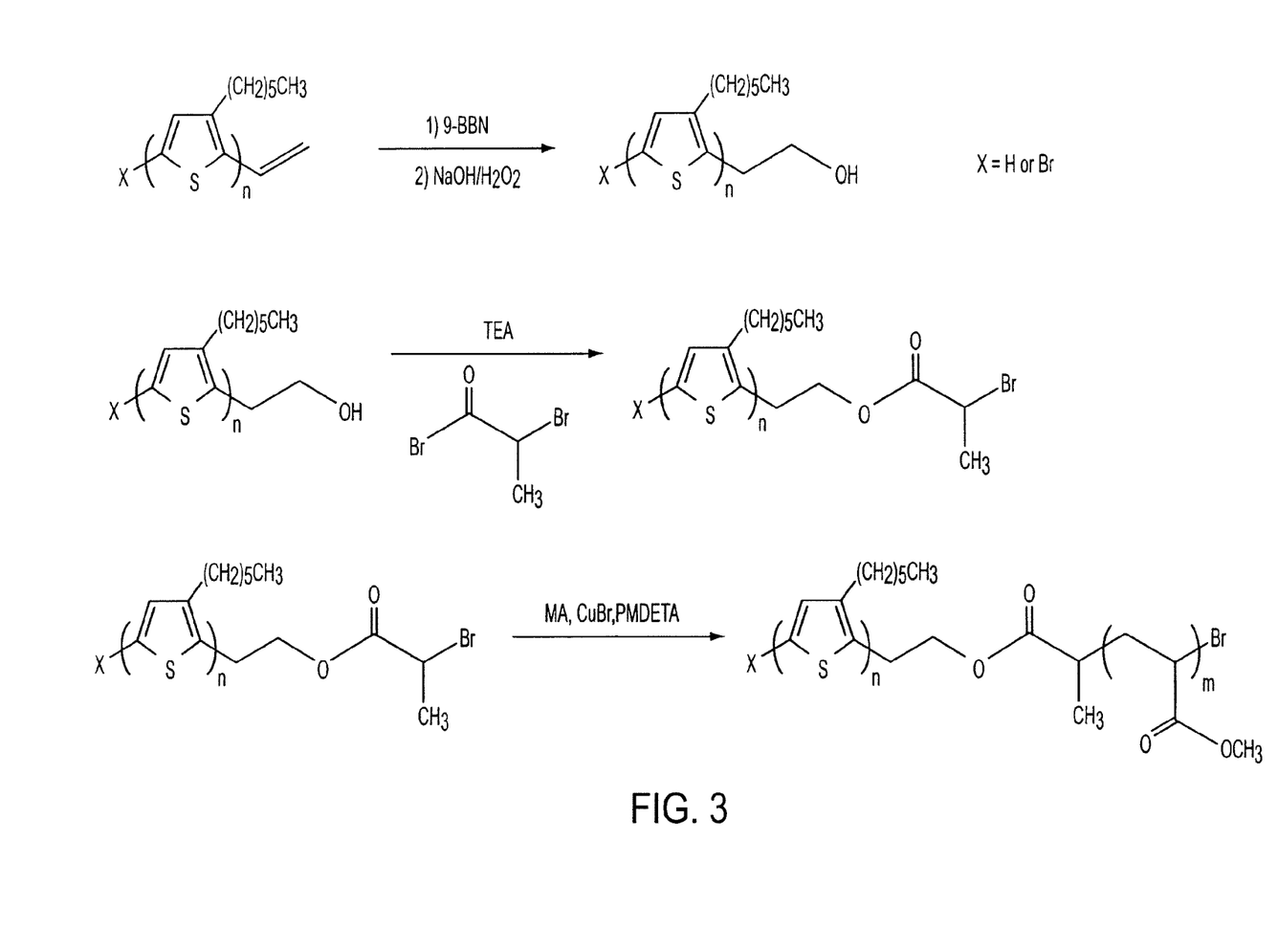
FIG. 3 shows a synthetic protocol for the synthesis of poly(3-hexylthiophene)-b-poly(methyl acrylate).

An exemplary synthesis of a block copolymer is shown in FIG. 3. The vinyl end group can be converted to $CH_2CH_2OH$ end group which can be then reacted with 2-bromopropionyl bromide to give a bromoester terminated PHT. The latter was used as macroinitiator for the atom transfer radical polymerization of acrylates (see for example Wang et al., *J. Am. Chem. Soc.,* 1995, 117, 5614-5615; Matyjaszewski et al., *Chem. Rev.,* 2001, 101, 2921-2990; Matyjaszewski et al. Eds. *Handbook of Radical Polymerization,* Wiley-Interscience: Hoboken, 2002; see also U.S. Pat. No. 6,602,974 to McCullough et al.).

Figure 4:
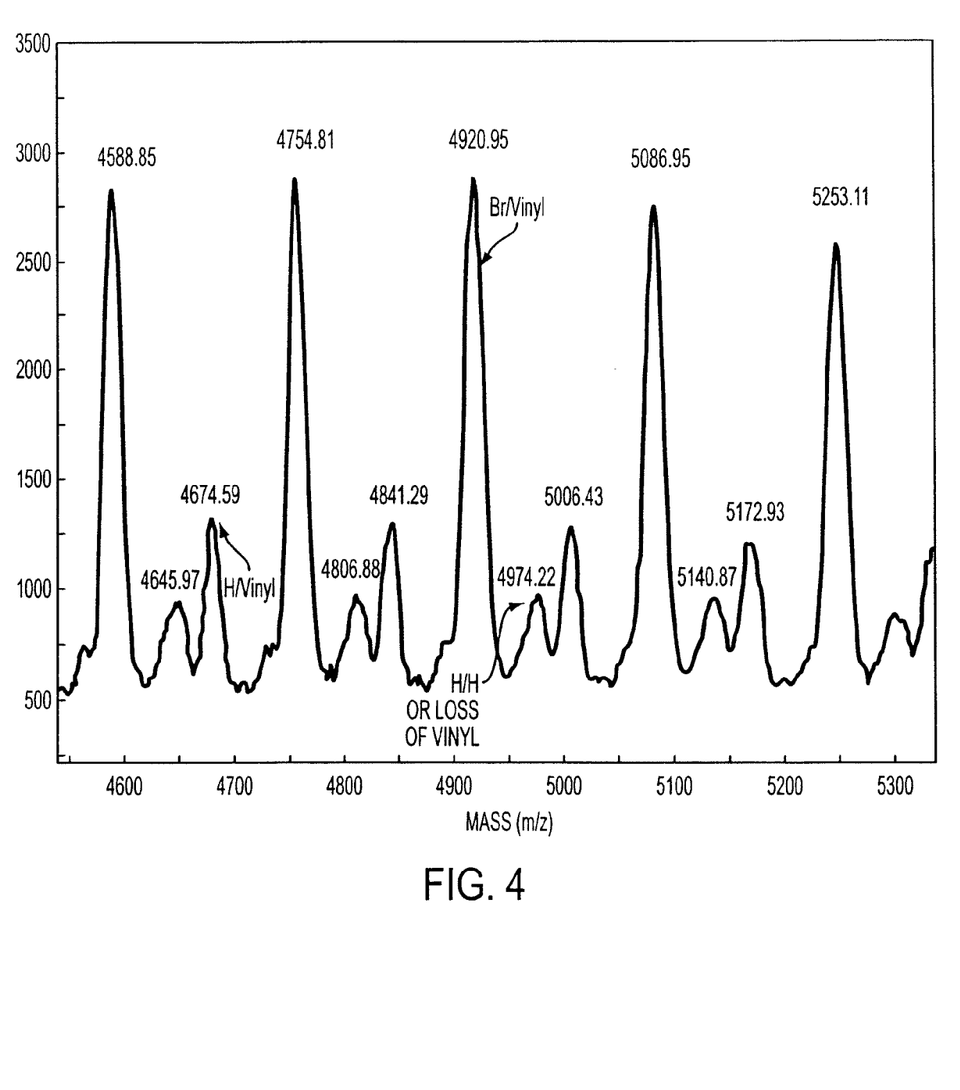
FIG. 4 shows expansion of MALDI-TOF MS spectra of vinyl terminated PHT.

End-capping of PHT can result in 90-100% vinyl end groups as indicated by MALDI-TOF MS (FIG. 4). MALDI-TOF MS spectra of vinyl mono-capped PHT can show two major peaks corresponding to Br/vinyl and H/vinyl.

Figure 5:
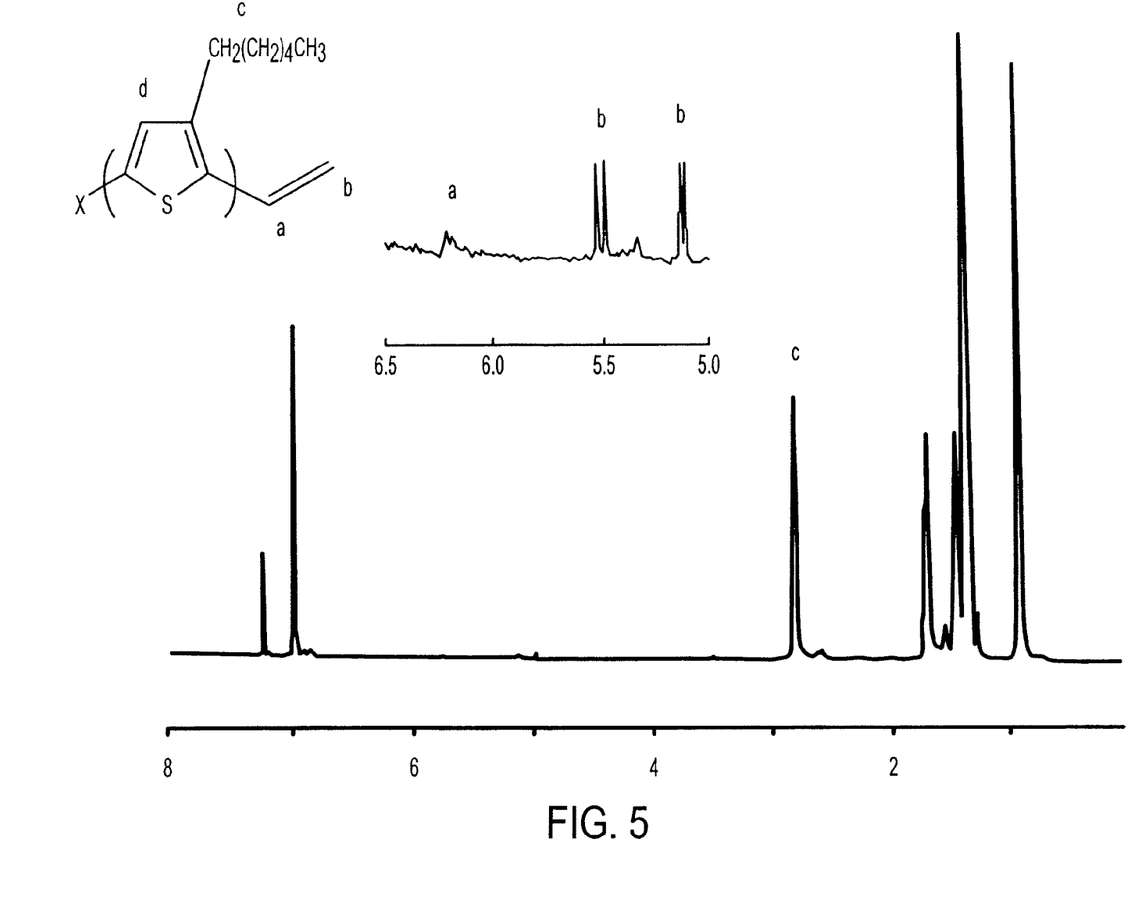
FIG. 5 shows $^1$H NMR spectrum of vinyl terminated PHT.

$^1$H NMR spectrum of vinyl terminated PHT can show the presence of vinyl protons at 5.1 ppm (dd), 5.5 ppm (dd) and 6.2 ppm (m) (FIG. 5). Molecular weight of the vinyl terminated PHT can be estimated by integrating (c) protons vs. (b) protons.

The conversion of vinyl to $CH_2CH_2OH$ terminated PHT can be indicated by the complete disappearance of the (a) and (b) vinyl protons and the appearance of new signals at 3 ppm (t), 3.9 ppm (t) due to the methylene protons and a broad singlet at 4.9 ppm due to the OH proton.

Formation of the bromoester terminated PHT also can be confirmed by $^1$H NMR.

ATRP of alkyl acrylates such as, for example, methyl acrylate or t-butyl acrylate, using for example CuBr—PMDETA and bromoester terminated PHT as macroinitiator can result in the formation of block copolymers such as for example poly(3-hexylthiophene)-b-poly(methyl acrylate) and poly(3-hexylthiophene)-b-poly(t-butyl acrylate).

Radical polymerization, including polymer products, ATRP methods, and polymer products are known in the art. See, for example, Matyjaszewski, eds. Handbook of Radical Polymerization. Hoboken: Wiley 2002; Matyjaszewski, Chem. Rev., 2001, 101, 2921.

Figure 6:
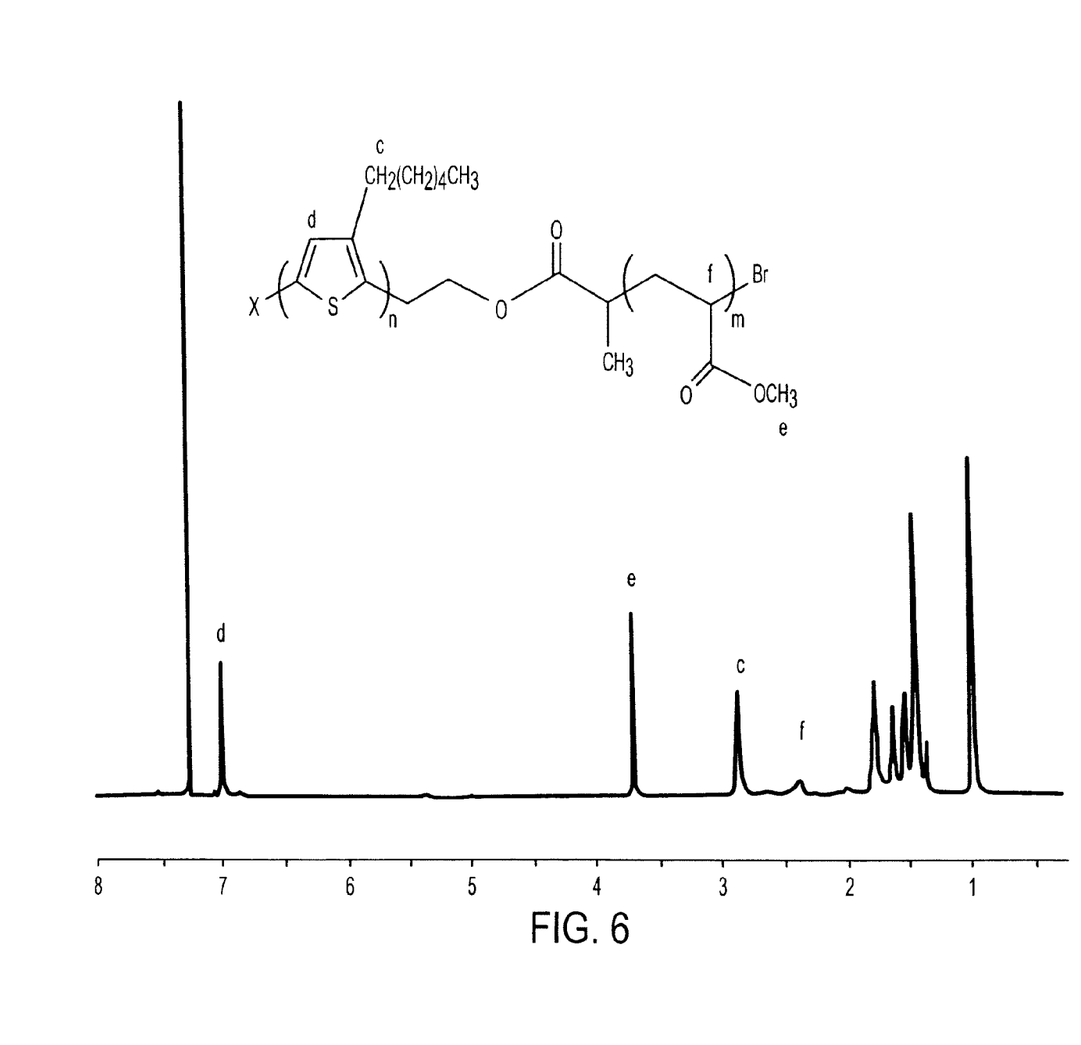
FIG. 6 shows $^1$H NMR spectrum of poly(3-hexylthiophene)-b-poly(methyl acrylate) with $DP_n$(PHT)=50; $DP_n$(PMA)=25.

A $^1$H NMR spectrum of poly(3-hexylthiophene)-b-(poly (methyl acrylate) is shown in FIG. 6. The methane protons of methyl acrylate block absorb 2.4 ppm, while the methoxy protons absorb at 3.6 ppm (FIG. 6).

Conductivities of the di-block copolymers synthesized by ATRP can be measured. They can show a conductivity dependence on the composition of the di-block copolymers.

The polymers can be used in doped or undoped form. Doping can be ambient doping. Doping can be controlled to vary conductivity from insulating, to semiconductive, to fully conductive. Conductivities greater than $10^{-5}$ S/cm can be achieved. If desired, conductivities greater than 10 S/cm can be achieved. The amount of block copolymer non-conductive component, and/or the amount of non-conductive blend component can be varied to help control conductivity and provide suitable balance of conductivity and material properties for a given application.

Additional description about and characterization of block copolymers is provided in Iovu et al., *Polymer*, 46 (2005) 8582-8586, which is hereby incorporated by reference in its entirety including working examples, experimental details, figures and tables.

The following table provides composition of poly(3-hexylthiophene)-b-poly(methyl acrylate) diblock copolymers.

| Time (min) | PHT (mol %) | PMA (mol %) | Mn (GPC) | PDI (GPC) |
|---|---|---|---|---|
| 0 | 100 | 0 | 12,200 | 1.17 |
| 5 | 97.0 | 3.00 | 12,290 | 1.24 |
| 105 | 67.0 | 33.00 | 14,350 | 1.27 |
| 190 | 52.4 | 47.6 | 15,180 | 1.33 |
| 380 | 42.5 | 57.5 | 15,340 | 1.49 |
| 480 | 41.2 | 58.8 | 15,400 | 1.60 |

The resulting copolymers were very soluble in many organic solvents and possessed excellent film forming properties. Solid state morphology of these materials was investigated by SEM. In contrast to the solution processed conducting films of PATs, where the film quality ranges from brittle to cracked, the films of these block copolymers showed a very dense, uniform morphology, which correlates well with the observed high conductivities. Conductivity is a function of copolymer composition and film thickness. The following table provides conductivities of poly(3-hexylthiophene)-b-poly(methyl acrylate) as function of copolymer composition:

| PHT (mol %) | PMA (mol %) | Conductivity (σ, S/cm) | Film Thickness (microns) |
|---|---|---|---|
| 100 | 0 | 32 | 1.14 |
| 67 | 33 | 14 | 1.35 |
| 52.4 | 47.6 | 28 | 0.55 |
| 41.2 | 58.8 | 4 | 1.66 |

Polymer films were prepared by drop casting from toluene solutions. The casting solutions were prepared by dissolving 5 mg of polymer in 1 mL of dry toluene, sonicating for 5 min, followed by the filtration of clear solutions through PTFE 0.45 micron filters. Films were drop cast onto 22 mm2 cover glass that were washed with chromic acid solution, rinsed several times with acetone and hexanes and dried before drop casting. Conductivities were measured for films of the block copolymers oxidized with iodine by the 4-point probe method. The film thickness was measured by scanning electron microscopy and the conductivity calculated according to the following equation:

$$\sigma 1/4.53\ RI \text{ where } R \text{ is resistance } (R=V/I) \text{ and } I \text{ is film thickness.}$$

Compositions of poly(3-hexylthiophene)-b-poly(t-butyl acrylate) di-block copolymers were prepared and showed similar electrical properties with the block methyl acrylate system described above.

| Time (min) | PHT (mol %) | PtBuA (mol %) | Mn (GPC) | PDI (GPC) |
|---|---|---|---|---|
| 0 | 100 | 0 | 5,600 | 1.40 |
| 300 | 53.2 | 46.8 | 6,800 | 1.55 |

Applications:

The applications of these materials are not particularly limited but include optical, electronic, semiconducting, electroluminescent, photovoltaic, LEDs, OLEDs, PLEDs, sensors, transistors, batteries, flat screen displays, organic lighting, printed electronics, nonlinear optical materials, dimmable windows, RFID tags, fuel cells, and others. See for example Kraft et al., *Angew. Chem. Int Ed.*, 1998, 37, 402-428 and discussion of applications which is hereby incorporated by reference in its entirety. See also, Shinar, *Organic Light-Emitting Devices*, Springer-Verlag, 2004. See also '974 patent noted above. Hole-injection layers can be fabricated. Multilayer structures can be fabricated and thin film devices made. Thin films can be printed. Patterning can be carried out. Printing on consumer products can be carried out. Small transistors can be fabricated. In many applications, the composition is formulated to provide good solution processing and thin film formation. Blends with other polymers including conductive polymers can be prepared. The nanowire morphology of the block copolymers can be exploited in nanoscale fabrication.

End-group functionalization of HT-PTs can provide a number of new uses for these polymers including end-group-driven self-assembly onto surfaces and into conducting polymer networks, and their use as building blocks for the synthesis of block copolymers (e.g., Liu et al. *Angew. Chem. Int. Ed.* 2002, 41, 4.).

The invention is further described with use of the following non-limiting working examples including FIGS. 4-6.

WORKING EXAMPLES

Materials. The monomer 2,5-dibromo-3-hexylthiophene 1 was synthesized according to the literature procedure (Loewe et al. *Adv. Mater.* 1999, 11, 250). All reactions were performed under prepurified nitrogen or argon, using oven dried glassware. Tetrahydrofuran (THF) was distilled from sodium benzophenone ketyl prior to use. Ni(dppp)Cl2, allylmagnesium bromide, butylmagnesium chloride, benzyl magnesium chloride, ethynyl magnesium bromide, methylmagnesium bromide, vinylmagnesium bromide, tert-butyl magnesium chloride, p-tolylmagnesium bromide, phenylmagnesium bromide, and 4-(2-tetrahydro-2H-pyranoxy)phenylmagnesium bromide were purchases from Aldrich Chemical Co. and used without further purification.

Typical Synthesis of End-Capped Regioregular Poly(3-hexylthiophene): 2,5-dibromo-3-hexylthiophene 1 (1.63 g, 5.0 mmol) was dissolved in THF (50 mL). tert-Butylmagnesium chloride (2.5 mL, 5.0 mmol) was added via syringe and the mixture was refluxed for 1.5 h. The reaction mixture was then allowed to cool to room temperature and Ni(dppp)Cl$_2$ (45 mg, 0.08 mmol) was added in one portion. The mixture was stirred for 10 min at room temperature, then the Grignard reagent (10-30 mol % of monomer) was added via syringe to the reaction mixture. The mixture was stirred for 2 min and then poured into methanol to precipitate the polymer. The polymer was filtered into an extraction thimble and then washed by Soxhlet extraction with methanol, hexane, and chloroform. The polymer was isolated from the chloroform extracts. End group composition was evaluated with MALDI-TOF MS (Voyager-DE STR Biospectrometry workstation by Biosystems, terthiophene matrix, linear mode, sometimes performed before extractions), and the polymer structure was confirmed with 1H NMR (Bruker 500 MHz instrument).

Characterization of (H/Br poly(3-hexylthiophene) in Typical Synthesis: $^1$H NMR (500 MHz, CDCl$_3$): $\delta_H$ 0.91 (t, J=7 Hz, 3H), 1.40 (m, 6H), 1.69 (t, J=7 Hz, 2H), 2.80 (t, J=7 Hz, 2H), 7.46 (s, 1H); GPC: M$_n$: 11364, PDI: 1.2; MALDI-MS: m/z: 6239.4 [M$^+$] (calcd: 6231.2, DP of 46, H/Br end groups). Characterization of 1: $^1$H NMR (500 MHz, CDCl$_3$): Hexyl peaks are the same as above with $\delta_H$ 5.11 (d, J=11 Hz, 1H), 5.49 (d, J=11 Hz, 1H), 6.20 (m, 1H), 7.14 (s, 55H); GPC: M$_n$: 11218, PDI: 1.1; MALDI-MS: m/z: 4927.2 [M$^+$] (calcd: 4927.7, DP of 29, Br/Vinyl end groups). Characterization of 2: $^1$H NMR (500 MHz, CDCl$_3$): Hexyl peaks same as above with $\delta_H$ 3.49 (d, J=6.5 Hz, 2H), 5.12 (d, J=6.5 Hz, 2H), 5.98 (m, 1H), 7.14 (s, 44H); GPC: PDI: 1.1; MALDI-MS: m/z: 4110.3 [M$^+$] (calcd: 4111.6, DP of 24 Br/Allyl end groups). Characterization of 10 (uncapped): $^1$H NMR (500 MHz, THF d$_8$): $\delta_H$ 0.92 (t, J=7 Hz, 3H), 1.37 (m, 6H), 2.85 (t, J=7 Hz, 3H), 7.08 (s, 1H) (remaining two protons buried under solvent peak); GPC: M$_n$: 11200, PDI: 1.2; MALDI-MS: m/z: 7561.0 [M$^+$] (calcd: 7561.4, DP of 45, H/Br end groups). Characterization of 3: $^1$H NMR (500 MHz, THF d$_8$): (Hexyl peaks are the same as for 10 with, $\delta_H$ 4.12 (s, 1H), 7.05 (s, 39H); GPC: M$_n$: 8232, PDI: 1.4; MALDI-MS: m/z: 5768.0 [M$^+$] (calcd: 5258.6, DP of 34, ethynyl/Br end groups). Characterization of 4: $^1$H NMR (500 MHz, THF d$_8$): (Hexyl peaks same as for 10 with, $\delta_H$ 7.11 (s, 41H), 7.43 (m, 2H), 7.47 (m, 8H); GPC: M$_n$: 12000, PDI: 1.1; MALDI-MS: m/z: 8305.9 (M$^+$) (calcd: 8302.2, DP of 49, phenyl/phenyl end groups). Characterization of 5: $^1$H NMR (500 MHz, THF d$_8$): (Hexyl peaks same as for 10 with, $\delta_H$ 7.10 (s, 29H), 7.24 (d, J=8 Hz, 4H), 7.36 (d, J=8 Hz, 4H); GPC: M$_n$: 6700, PDI: 1.1; MALDI-MS: m/z: 4508,6 [M$^+$] (calcd: 4505.6, DP of 26, tolyl/tolyl). Characterization of 6: $^1$H NMR (500 MHz, THF d$_8$): (Hexyl peaks same as for 10 with, $\delta_H$ 4.13 (s, 2H), 7.10 (s, 41H), 7.26 (m, 10H); GPC: M$_n$: 13700, PDI: 1.2, MALDI-MS: m/z: 8002.1 [M$^+$] (calcd: 7997.6, DP of 47, benzyl/benzyl). Characterization of 7: $^1$H NMR (500 MHz, THF d$_8$): (Hexyl peaks same as for 10 with, $\delta_H$ 6.81 (d, J=8.5 Hz, 4H), 7.07 (s, 34H), 7.28 (d, J=8.5 Hz, 4H); GPC: M$_n$: 4118, PDI: 2.51; MALDI-MS: m/z: 4348.2 [M$^+$] (calcd: 4343.2, DP of 25, Ph-OH/Ph-OH). Characterization of 8: $^1$H NMR (500 MHz, CDCl$_3$): (Hexyl peaks same as for H/Br poly(3-hexylthiophene) with, $\delta_H$ 2.37 (s, 6H), 6.98 (s, 43H); GPC: M$_n$: 8.500, PDI: 1.1; MALDI-MS: m/z: 5185.9 [M$^+$] (calcd: 5184.8, DP of 31, methyl/methyl). Characterization of 9: $^1$H NMR (500 MHz, THF d$_8$): (Hexyl peaks same as for 10, butyl peaks overlap with hexyl); GPC: M$_n$: 7506, PDI: 1.1; MALDI-MS: m/z: 4508.6 [M$^+$] (calcd: 4505.6, DP of 26, butyl/butyl).

Synthesis of Vinyl Terminated PHT. 4.9 g (15 mmol) 2,5-dibromo-3-hexylthiophene was dissolved in 150 mL dry THF. 7.5 mL (15 mmol) solution t-butyl magnesium chloride 2 M in diethyl ether was added via syringe under nitrogen and the reaction mixture was refluxed from 90 min. The reaction mixture was cooled to room temperature and 0.15 g (0.27 mmol) Ni(dppp)Cl$_2$ catalyst was added. The mixture was stirred for additional 10 min at room temperature followed by addition of 3 mL (3 mmol) solution of vinyl magnesium bromide 1 M. After 5 min., the reaction mixture was poured into methanol and the polymer precipitated.

Hydroboration/Oxidation of Vinyl Terminated PHT. 2 g (0.2 mmol; M$_n$(NMR)=10,000) vinyl terminated PHT was dissolved in 100 mL dry THF. 4 mL (2 mmol) 9-BBN solution 0.5 M in THF was added with using a deoxygenated syringe under nitrogen. The reaction mixture was stirred for 24 h at 40° C. 2 mL 6 M NaOH solution was then added to the reaction flask under nitrogen. The reaction mixture was stirred for an additional 15 min. and cooled to room temperature. 2 mL hydrogen peroxide (33%) was added to the reaction mixture and the reaction stirred for 24 h at 40° C. The hydroxyl terminated PHT was isolated by precipitation in a methanol-water mixture. The polymer was filtered and purified by Soxhlet extraction with methanol.

Synthesis of PHT macroinitiator. 1 g (0.1 mmol) hydroxy terminated PHT was dissolved in 100 mL dry THF and the mixture warmed to 40° C. until the polymer was completely dissolved. 9 mL (0.066 mole) triethylamine was added to the polymer solution and 7.5 mL (0.06 mole) 2-bromopropionyl bromide added dropwise under nitrogen. The reaction mixture was stirred at room temperature for 24 h and the resultant PHT macroinitiator was precipitated in methanol and purified.

ATRP of methyl acrylate using PHT macroinitiator. The polymerization was performed using CuBr—PMDETA as catalyst, in toluene (50 vol. %) at 80° C. The molar ratio for the polymerization of methyl acrylate was [MA]:[PHT-MI]:[CuBr]:[PMDETA]=100:1:1:2.

ATRP of t-butyl acrylate using PHT macroinitiator. The reaction procedure was similar to the one used for methyl acrylate polymerization.

Analyses. Conversions were determined on a Shimadzu GC-14A gas chromatograph using a capillary column (CEC-Wax, 30 m×0.53 mm×1.0 microns, Chrom Expert Co.). Size exclusion chromatography (SEC) measurements were conducted using chloroform as the eluant (flow rate 1 mL/min, 30° C.), and a Waters 2487 dual lambda absorbance UV detector. Polystyrene standards were employed for the SEC calibration. NMR spectra of the polymer solutions in CDCl3 were collected on a Bruker Avance 500 MHz spectrometer. MALDI-TOF MS analysis was performed using a Voyager-DE STR Biospectrometry workstation by Biosystems.

Additional Embodiments for Masked Functional Groups

A more diverse group of end capped polymers can be prepared as described in Jeffries-El et al, *Macromolecules*, 2005, 38, 10346-10352 (in the following, numbers identifying compounds are associated with this paper). For example, the synthesis of Grignard reagents bearing masked protecting groups was investigated. This provides for the incorporation of a variety of different functional groups with use of suitable protecting groups. Functional groups of interest include nucleophilic groups including, for example, aldehydes, amines, phenols, and thiols. Electrophilic masked groups can also be used.

Figure 7:
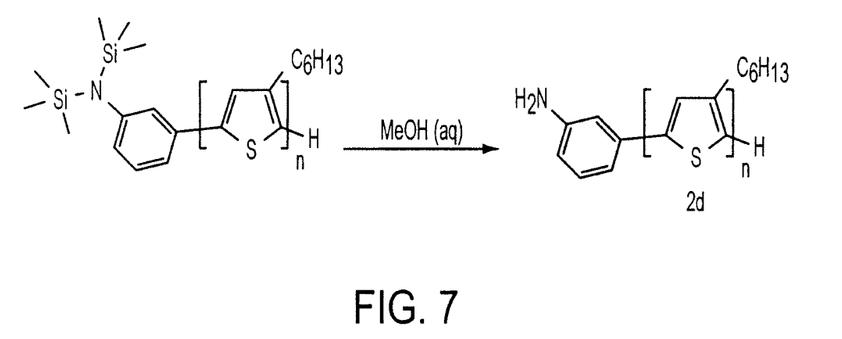
FIG. 7 shows deprotection of an amine polymer.

For example, an amine group can be incorporated using, for example, the masked Grignard 3-[bis(trimethylsilyl) amino]phenyl magnesium chloride. This protecting group can be very labile and can be hydrolyzed during, for example, a work-up yielding the amino terminated polymer (FIG. 7).

The MALDI-TOF and $^1$H NMR spectroscopy, in working examples, showed that this polymer can be mono-terminated. While the present invention is not limited by theory, this is most likely due to deactivation of the catalyst by the electron rich trimethylsilyl groups.

Figure 8:
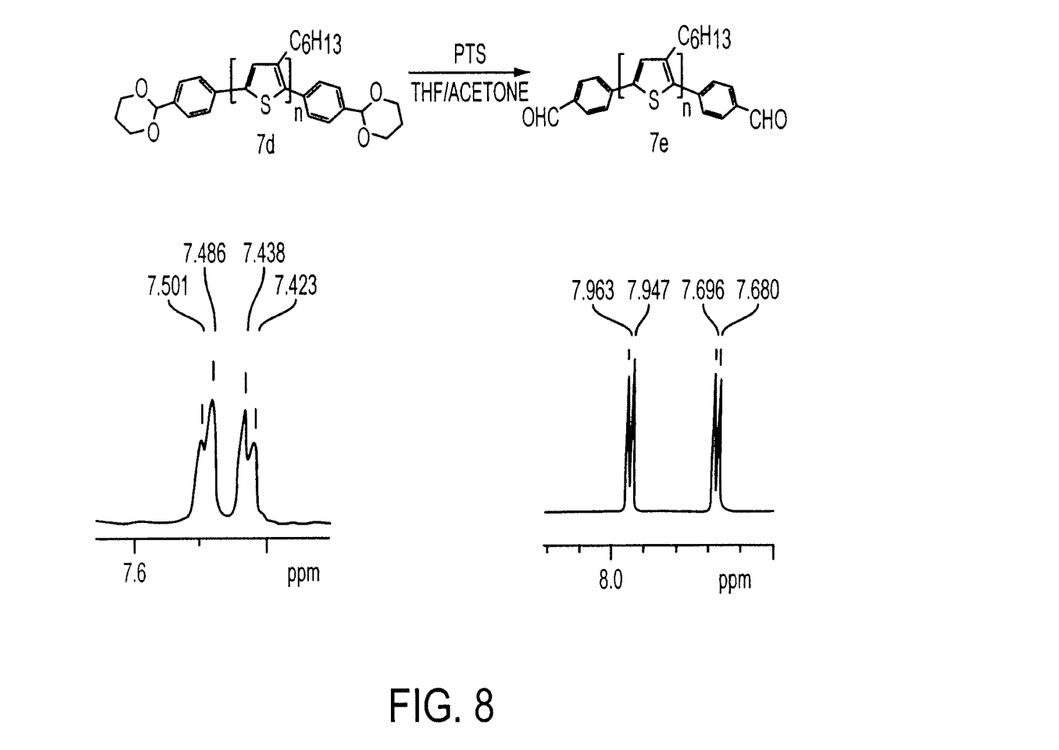
FIG. 8 shows aromatic region of $^1$H NMR spectra of phenyldioxolane and benzaldehyde terminated polymer.

In addition, aldehyde groups can be introduced onto the polymer by using, for example, the masked Grignard (1,3-dioxan-2yl)phenylmagnesium bromide. In working examples, the incorporation of the dioxan-2yl end groups onto the polymer was unclear by MALDI due to the similarity between the molecular weight of the end-group 163.08 and the polymer repeating unit 166.23. However $^1$H NMR showed the incorporation of the masked aldehyde onto both ends of the polymer in the working examples. Treatment of a solution of the dioxan-polymer in THF with pyridinium p-toluene sulfonate (PTS) yielded the aldehyde terminated polymer in quantitative yield (FIG. 8). The deprotection was monitored by MALDI-TOF MS and $^1$H NMR in working examples. The MALDI spectra of the dioxane polymer showed one set of peaks corresponding to both dioxane/dioxane (calc. 5643.81) and dioxane/H (calc. 5652.01), for example when n=32 for the former and n=34 for the latter. However, the MALDI-TOF spectra of the aldehyde polymer shows narrow peaks at 5537.66 and 5570.67, corresponding to Ph-CHO/Ph-CHO (5527.72) and Ph-CHO/H (calc. 5589.86) for n=34 and 35 respectively. The $^1$H NMR spectrum shows peaks at 7.43 and 7.49 for the dioxane polymer. These peaks disappear from the spectra of the deprotected polymer and two new peaks appear at 7.69 ppm and 7.96 ppm. Additionally, a small aldehyde peak can be seen at 10.15 ppm in the working examples.

Figure 9:
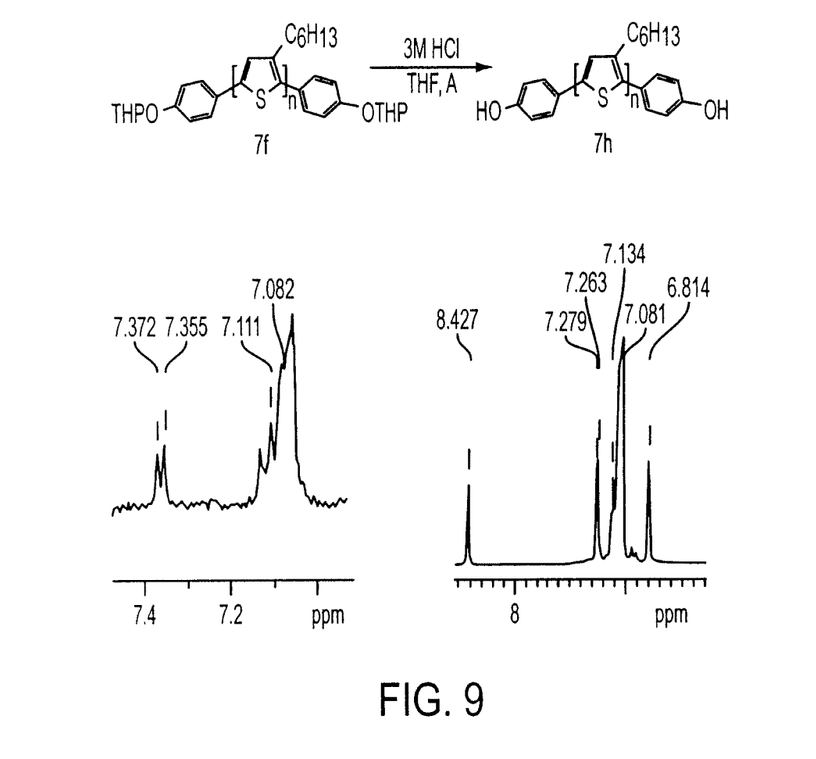
FIG. 9 shows aromatic region of $^1$H NMR Spectra of tetrahydropyranyl and phenol terminated polymer.

In a similar fashion using 4-(2-tetrahydro-2H-pyranoxy) phenylmagnesium bromide, a masked phenol was introduced onto the polymer in working examples. Treatment of a solution of the OTHP-polymer in THF with 6M HCl yielded the phenol terminated polymer in quantitative yield (FIG. 9). The MALDI spectra of the OTHP polymer has peaks at 4427.08 and 4509.03, corresponding to OTHP/OH (calc. 4425.88), due to partial deprotection and OTHP/OTHP (calc. 4508.61) for n=25. However, the MALDI-TOF spectra of the phenol polymer shows narrow peaks at 4417.36 and 4511.17, corresponding to OH/H (calc. 4416.06) and OH/OH (calc. 4509.1) for n=26. Although the masses for the peaks before and after the deprotection reaction are similar, unambiguous assignment of these peaks is aided by the $^1$H NMR spectrum, which shows peaks at 7.11 and 7.36 for the OTHP polymer. These peaks disappear from the spectra of the deprotected polymer and two new peaks appear at 6.80 ppm and 7.27 ppm. Additionally, a small phenol peak can be seen at 8.43 ppm in the working examples.

Figure 11:
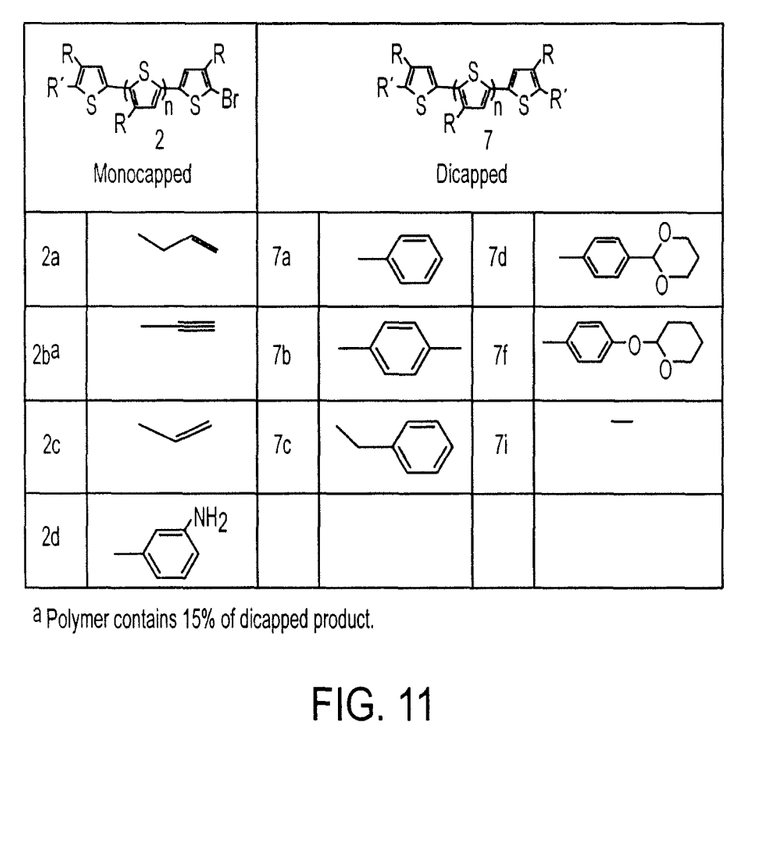
FIG. 11 provides a Table also showing end groups synthesized and resulting monocapped and dicapped polymers including protecting groups and reactive functional groups.

Masking or protecting groups are further illustrated in FIG. 11 (7d, 7f; note also unmasked amino group in 2d).

The non-limiting working examples presented herein demonstrate the efficiency and versatility of the modified Grignard metathesis reaction to generate P3ATs bearing a variety of different end groups in situ. This method is also very reliable and consistently produces polymers with high percentages (for example, about 70% to about 99%, or 80-99%) of end-group functionality. This reaction also works well on the large scale. For example, experiments performed with 16 grams of monomer yielded 5.5 grams of P3HT with >90% end-group functionalized, showing no decrease in functionality as the reaction is scaled up. This provides synthesizing these materials on large scale and using these materials in a variety of applications including those described herein.

Additional experimental details are provided taken from the Jeffries El *Macromolecules* paper:

Experimental Section

Materials. All reactions were performed under prepurified nitrogen or argon, using oven-dried glassware. Tetrahydrofuran (THF) was distilled from sodium benzophenone ketyl prior to use. Ni(dppp)Cl$_2$, allylmagnesium bromide, benzylmagnesium chloride, 3-(bis[trimethylsilyl]amino)-phenylmagnesium chloride, tert-butylmagnesium chloride, ethynyl magnesium bromide, methylmagnesium bromide, phenylmagnesium bromide, 4-(2-tetrahydro-2H-pyranoxy)phenylmagnesium bromide, p-tolylmagnesium bromide and vinylmagnesium bromide were purchased from Aldrich Chemical Co. and used without further purification. 4-(1,3-dioxan-2-ylphenyl)magnesium bromide was purchased from Rieke Metals Inc. 2,5-dibromo-3-hexylthiophene 1 (Chen, T. A. et al., J. Am. Chem. Soc., 1995, 117, 233) was synthesized according to the literature procedures from 3-hexylthiophene (Tamao, K. et al., Tetrahedron, 1982, 38, 3347-3354).

Instrumentation. $^1$H NMR spectra were recorded using a Brucker 500 MHz instrument. MALDI-TOF MS (Voyager-DE STR BioSpectrometry) workstation by Biosystems was used to record spectra in linear mode, in which samples were irradiated under high vacuum using a nitrogen laser (wavelength 337 nm, 2 ns pulse). The accelerating voltage was 20 kV, and the grid voltage and low mass gate were 92.0% and 1000.0 Da., respectively. The matrix used for all samples was 2,2': 5,2''-Terthiophene (Aldrich). GPC measurements were carried out on a Waters 2690 separation module equipped with three 5 μm Phenogel columns connected in series (guard, $10^5$, 1000 and 100 Å) and a Waters 2487 dual λ absorbance UV detector. Analyses were performed at 30° C. using chloroform as the eluent, and the flow rate was 1.0 μL/min. Calibration was based on polystyrene standards obtained from Polymer Standards Service.

Typical End-Capping Reaction. In a three neck round bottom flask 2,5-dibromo-3-hexylthiophene 1 (1.63 g, 5.0 mmol) was dissolved in THF (10 mL) and stirred under N$_2$. tert-Butylmagnesium chloride (2.5 mL, 5.0 mmol) was added via syringe and the mixture was stirred at room temperature for 2 hours. The reaction mixture was then diluted to 50 mL with THF and Ni(dppp)Cl$_2$ (1.75-2.25 mol %) was added in one portion. The mixture was stirred for 10 minutes at room temperature, and the Grignard reagent (20-30 mole % of monomer) was added via syringe to the reaction mixture. The mixture was stirred for an additional 2 minutes and then poured into methanol to precipitate the polymer. The polymer was filtered into an extraction thimble and then washed by Soxhlet extraction with methanol, hexanes, and chloroform. The polymer was isolated from the chloroform extraction.

Characterization of 2a (allyl terminated): $^1$H NMR (500 MHz, CDCl$_3$): $\partial_H$ 0.913 (t, J=7 Hz, 3H), 1.40 (m, 6H), 1.69 (t, J=7 Hz, 2H), 2.80 (t, J=7 Hz, 2H), 5.12 (d, J=6.5 Hz, 2H), 5.51 (d, 2H), 6.90 (m, 1H), 6.98 (s, 34H); GPC: M$_n$: 6,900, PDI: 1.19; MALDI-MS: m/z: 4105.85 [M$^+$] (calcd: 4110.50, DP of 24, Br/Allyl end groups).

Characterization of 2b (ethynyl terminated): $^1$H NMR (500 MHz, CDCl$_3$): (Hexyl peaks are the same as for 2a with, $\partial_H$ 3.14 (s, 1H), 6.98 (s, 68H); GPC: M$_n$: 12,041, PDI: 1.2; MALDI-MS: m/z: 7252.15 [M$^+$] (calcd: 7252.89, DP of 43, ethynyl/Br end groups).

Characterization of 2c (vinyl terminated): $^1$H NMR (500 MHz, CDCl$_3$): Hexyl peaks are the same as for 2a with $\partial_H$ 5.12 (d, J=11 Hz, 1H), 5.51 (d, J=11 Hz, 1H), 6.83 (m, 1H), 7.26 (s, 28H); GPC: M$_n$: 6,987, PDI: 1.17; MALDI-MS: m/z: 4106.38 [M$^+$] (calcd: 4101.51, DP of 24, Br/Vinyl end groups).

Characterization of 7a (phenyl terminated): $^1$H NMR (500 MHz, THF d$_8$): $\partial_H$ 0.926 (t, J=7 Hz, 3H), 1.37 (m, 6H), 2.85 (t, J=7 Hz, 2H), 7.10 (s, 43H), 7.43 (m, 2H), 7.47 (m, 8H); (remaining two protons buried under solvent peak). GPC: M$_n$: 10,900, PDI: 1.12; MALDI-MS: m/z: 6317.21 [M$^+$] (calcd: 6308.05, DP of 37, phenyl/phenyl endgroups).

Characterization of 7b (tolyl terminated): $^1$H NMR (500 MHz, THF d$_8$): (Hexyl peaks same as for 7a with, $\partial_H$ 7.08 (s, 37H), 7.24 (d, J=8 Hz, 4H), 7.36 (d, J=8H, 4H); GPC: M$_n$: 9,300 PDI: 1.1; MALDI-MS: m/z: 5845.42 [M$^+$] (calcd: 5837.54, DP of 34, tolyl/tolyl).

Characterization of 7c (benzyl terminated): $^1$H NMR (500 MHz, THF d$_8$): (Hexyl peaks same as for with, $\partial_H$ 4.13 (s, 2H), 7.10 (s, 41H), 7.26 (m, 10H); GPC: M$_n$: 13,700, PDI: 1.2; MALDI-MS: m/z: 8002.1 [M$^+$] (calcd: 7997.6, DP of 47, benzyl/benzyl).

Characterization 7d (aminophenyl terminated): $^1$H NMR (500 MHz, THF d$_8$): (Hexyl peaks same as for 7a with, $\partial_H$ 7.08 (s, 40H), 7.13 (m, 4H); GPC: M$_n$:15,532, PDI: 1.24; MALDI-MS: m/z: 8080.88 [M+] (calcd: 8070.52, DP of 48, Ph-NH$_2$/H).

Characterization of 7e (1,3-dioxan-2-yl-phenyl)terminated): $^1$H NMR (500 MHz, THF d$_8$): (Hexyl peaks same as for 7a with, $\partial_H$ 3.97 (t, 3H), 4.19 (t, 3H), 5.51 (s, 2H), 7.08 (s, 49H), 7.33 (d, J=9 Hz, 4H), 7.49 (d, J=9 Hz, 4H); GPC: M$_n$: 11,648, PDI: 1.27; MALDI-MS: m/z: 7001.45 [M$^+$] (calcd: 6999.60, DP of 40, dioxolane/dioxolane).

Deprotection of aldehyde. In a round bottom flask the dioxanyl terminated polymer 7e (1.00 g) was dissolved in 100 mL of THF. The reaction was heated to reflux and then pyridinium p-toluene sulfonate (PTS) (50 mg) in 10 ml of (80% acetone aq.) was added. The reaction was heated overnight and then precipitated into a beaker of methanol. The crude polymer was filtered, dried, and recovered in quantitative yield.

Characterization of 7f (benzaldehyde terminated): $^1$H NMR (500 MHz, THF d$_8$): (Hexyl peaks same as for 7a with, $\partial_H$ 7.09 (s, 55H), 7.69 (d, J=8 Hz, 4H), 7.95 (d, J=8 Hz, 4H); GPC: M$_n$: 12,034, PDI: 1.09; MALDI-MS: m/z: 7045.81 [M$^+$] (calcd: 7053.60, DP of 41, Ph-CHO/Ph-CHO).

Characterization of 7g (phenyl tetrahydropyranyl terminated): $^1$H NMR (500 MHz, THF d$_8$): (Hexyl peaks same as for 7a with, $\partial_H$ 7.08 (s, 30H), 7.11 (d, J=8.5 Hz, 4H), 7.36 (d, J=8.5 Hz, 4H); GPC: M$_n$: 9,362, PDI: 1.17; MALDI-MS: m/z: 4509.03 [M$^+$] (calcd: 4509.75, DP of 25, Ph-OTHP/Ph-OTHP).

Deprotection of Phenol. In a round bottom flask the tetrahydropyranyl ether terminated polymer 7g (2.00 g) was dissolved in 50 mL of THF. The reaction was heated to reflux and then 5 drops of 6 M HCl were added. The reaction was heated overnight and then precipitated into a beaker of methanol. The crude polymer was filtered, dried, and recovered in quantitative yield. Characterization of 7h (phenol terminated) $^1$H NMR (500 MHz, THF d$_8$): (Hexyl peaks same as for 7a with, $\partial_H$ 6.81 (d, J=8.5 Hz, 4H), 7.07 (s, 36H), 7.28 (d, J=8.5 Hz, 4H); MALDI-MS: m/z 4348.2 [M$^+$] (calcd: 4343.2, DP of 25, Ph-OH/Ph-OH).

Characterization of 7i: $^1$H NMR (500 MHz, CDCl$_3$): (Hexyl peaks same as for 7a with, $\partial_H$ 2.37 (s, 6H), 6.98 (s, 43H); GPC: M$_n$: 8.500, PDI: 1.1; MALDI-MS: m/z: 5185.9 [M$^+$] (calcd: 5184.8, DP of 31, methyl/methyl).

What is claimed is:

1. A one-pot method of making a poly(3-substituted thiophene) which is at least 70% monocapped with alkenyl or alkynyl end group comprising (i) preparing a poly(3-substituted thiophene) precursor to form a polymer reaction mixture; and (ii) reacting the precursor in the polymer reaction mixture with an alkenyl or alkynyl Grignard reagent to form in one pot the poly(3-substituted thiophene) which is at least 70% monocapped with alkenyl or alkynyl end group, wherein the alkenyl or alkynyl end group comprises from two to five carbon atoms, and wherein the poly(3-substituted thiophene) which is at least 70% monocapped with alkenyl or alkynyl end group is also 20 percent or less dicapped.

2. The method according to claim 1, wherein the poly(3-substituted thiophene) is at least 86% monocapped with alkenyl or alkynyl end group.

3. The method according to claim 1, wherein the poly(3-substituted thiophene) is at least 91% monocapped with alkenyl or alkynyl end group.

4. The method according to claim 1, wherein the poly(3-substituted thiophene) is a poly(3-alkyl thiophene).

5. The method according to claim 1, wherein the alkenyl or alkynyl end group comprises vinyl, allyl, or ethynyl.

6. The method according to claim 1, wherein the poly(3-substituted thiophene) which is at least 70% monocapped with alkenyl or alkynyl end group is also 10 percent or less dicapped.

7. The method according to claim 1, wherein the poly(3-substituted thiophene) which is at least 70% monocapped with alkenyl or alkynyl end group is also 1 percent or less dicapped.

8. The method according to claim 1, wherein the poly(3-substituted thiophene) is at least 86% monocapped with alkenyl or alkynyl end group and the poly(3-substituted thiophene) is a poly(3-alkyl thiophene).

9. The method according to claim 8, wherein the alkenyl or alkynyl end group comprises vinyl, allyl, or ethynyl.

10. The method according to claim 8, wherein the poly(3-substituted thiophene) which is at least 86% monocapped with alkenyl or alkynyl end group is also 1 percent or less dicapped.

11. The method according to claim 1, wherein the poly(3-substituted thiophene) is at least 90% head-to-tail regioregular.

12. The composition according to claim 1, wherein the poly(3-substituted thiophene) is at least 98% head-to-tail regioregular.

13. The method according to claim 1, wherein the poly(3-substituted thiophene) is a regioregular polythiophene.

14. The method of claim 1, wherein the poly(3-substituted thiophene) precursor is prepared using Grignard metathesis polymerization of one or more 3-substituted thiophene monomers.

15. The method of claim 1, wherein the precursor is reacted with an alkenyl or alkynyl reagent by quenching the precursor with an excess of Grignard reagent.

16. The method of claim 1, wherein the reaction of the precursor with the Grignard reagent is followed by treatment with a proton source.

17. The method of claim 1, wherein the poly(3-substituted thiophene) which is at least 70% monocapped with alkenyl or alkynyl end groups further comprises bromine end groups.

* * * * *